Figure 1:
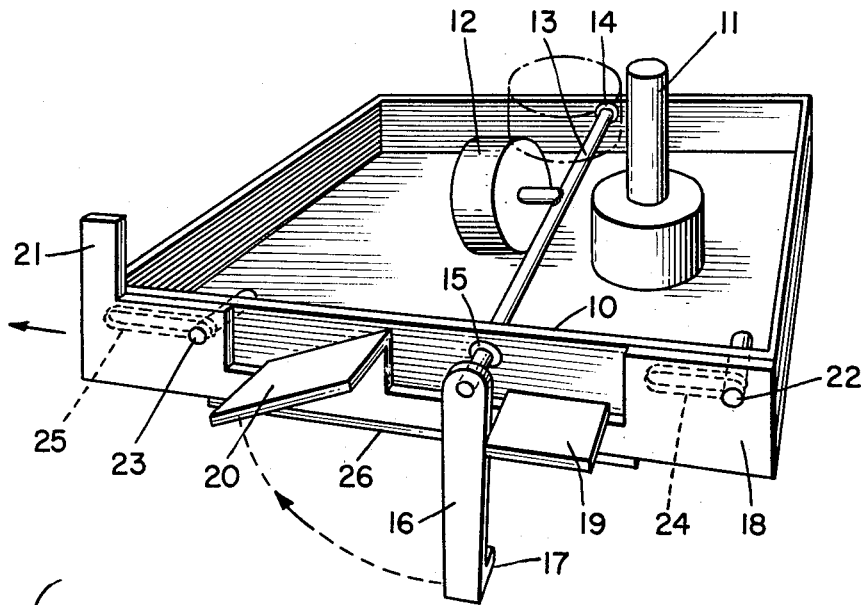

Nov. 3, 1964     G. H. EASH     3,154,956
DOUBLE CAM DEVICE
Filed Sept. 24, 1962

INVENTOR.
GEORGE H. EASH
BY
Elliott & Pastoriza
ATTORNEYS

United States Patent Office 3,154,956
Patented Nov. 3, 1964

3,154,956
DOUBLE CAM DEVICE
George H. Eash, Beverly Hills, Calif., assignor to Catamaran Corporation, Los Angeles, Calif., a corporation of California
Filed Sept. 24, 1962, Ser. No. 225,821
4 Claims. (Cl. 74—107)

This invention relates generally to actuating devices and more particularly to a novel double cam device for bringing two members into tight engagement with each other.

While the present invention has numerous applications, its preferred use is in conjunction with tape transport systems in which a pinch wheel is to be moved into engagement with a capstan for driving a magnetic tape. For purposes of illustration, accordingly, the preferred embodiment of the invention will be described in conjunction with the pinch wheel structure.

In the movement of a conventional pinch wheel into engagement with a capstan or equivalent drive means, it is desirable that the pinch wheel be relatively far removed from the capstan in order that the tape may readily be positioned against the capstan. However, when the pinch wheel is brought into engagement with the capstan, it is desirable that a very tight and secure engagement be effected. If such a tight engagement is to be effected by a conventional camming arrangement, the cam surfaces involved must be relatively long in order to move the pinch wheel through the required distance from its out-of-the-way location. In other words, the camming system employed to move the pinch wheel into engagement with the capstan necessitates a relatively large distance for the camming surfaces to operate in order that the pinch wheel will be transported through the required distance to engage the capstan and still provide the desired engaging force. If mechanical motion reduction systems are employed, the required force for effecting a tight engagement is correspondingly increased. Thus, it is not normally possible to effect a large movement and still provide a large engaging force.

With the foregoing in mind, it is a primary object of this invention to provide a novel double cam device which will effect a relatively large movement of one member towards another in response to a small movement of the cam structure to position the members relatively close together and then effect a very small movement of the one member against the other under a large camming force to effect the desired tight engagement between the members.

More particularly, it is an object to provide an improved double cam device for positioning a pinch wheel in engagement with a capstan in which movement of the cam structure itself need be only through a very small distance and yet a relatively large movement of the pinch wheel is realized so that a compact structure is provided.

More generally, it is an object to provide a double cam drive for moving one member into engagement with another in which initial movement of the member is effected through a relatively large distance for a very small movement of the camming structure and final movement of the member into engagement with the device is effected through a relatively large movement of the camming structure to the end that a large engaging force is provided.

Briefly, these and other objects and advantages of this invention are attained by mounting one member to be moved into engagement with another member to a rotatable shaft. One end of the shaft has an arm extending laterally therefrom so that arcuate swinging of the arm will swing the member into engagement as required. Initial swinging movement of the arm is effected by a first cam mounted on a slide plate to engage the arm relatively close to its point of connection to the shaft so that very small movement of the slide plate will effect a large swinging movement of the arm. A second cam means in the form of an inclined surface in turn is provided on the slide plate and positioned to engage the far end of the arm after the arm has been initially moved through a large arc. Subsequent further movement of the slide plate will then effect a camming action by the inclined surface against the far end of the arm and because of the inherent large lever action attained, a large engaging force is effected between the two members with resultant tight engagement of the first member against the second member.

An additional advantage to the foregoing type structure of dual camming action is the overall small movement necessary for effecting the desired operation with the advantage of reduced time involved in bringing the members from a far apart position into tight engagement. Further advantages reside in the fact that the overall structure may be relatively compactly packaged as a consequence of the small movement required of the cam structure itself.

Figure 2:
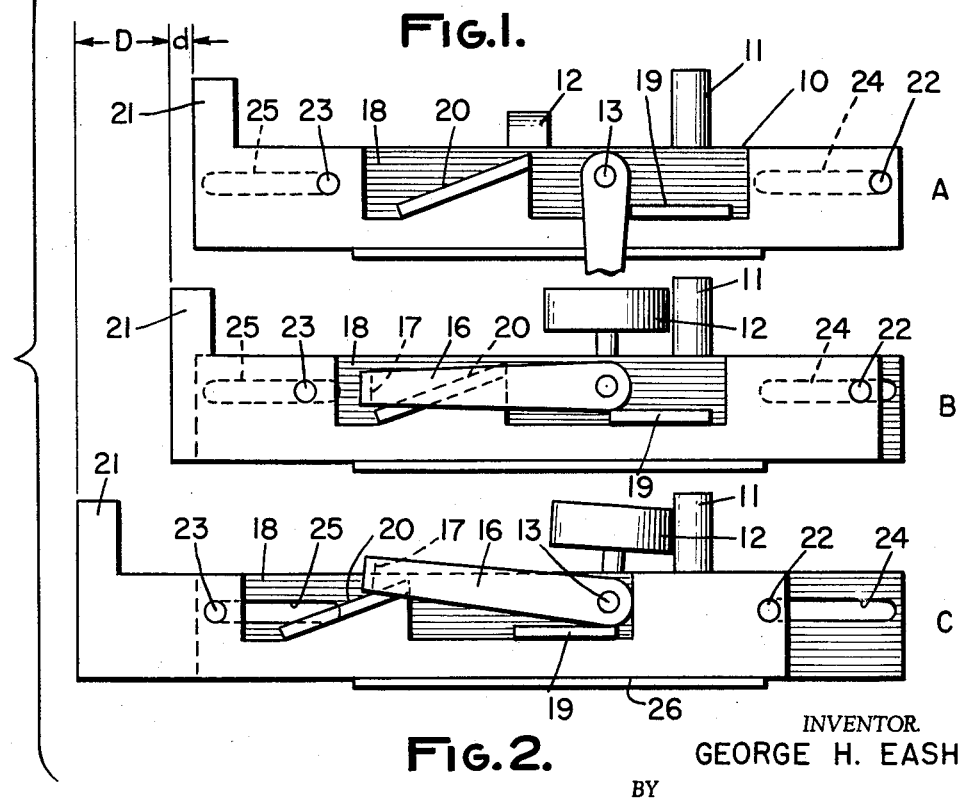

A better understanding of the invention will be had by now referring to a preferred embodiment thereof as illustrated in the attached drawings, in which:

FIGURE 1 is a schematic perspective view of a portion of a capstan and pinch wheel in which the novel double cam device is employed for effecting engagement between the capstan and pinch wheel; and, FIGURE 2 is a series of front elevational views of the device of FIGURE 1 illustrating various positions of the cam device during its operation.

Referring first to FIGURE 1, there is shown a frame structure 10 from which a capstan 11 projects. The capstan 11 is ordinarily employed to drive a magnetic tape. However, any equivalent rotatable structure constituting a member to be engaged may be provided.

As shown in FIGURE 1, there is provided a pinch wheel 12 mounted to a shaft 13 rotatably mounted to the frame as at 14 and 15 for rotative movement. By this arrangement, the pinch wheel 12 may be brought from a first position disposed relatively distant from the capstan 11 to a second position into engagement with the capstan as indicated in dotted lines by rotating the shaft 13 through approximately ninety degrees.

The novel double camming device for effecting this movement includes an arm 16 extending laterally from one end of the shaft 13 exterior of the frame 10 as shown. The lower end of this arm 16 terminates in a cam follower 17. A slide plate 18 in turn includes a first cam 19 projecting therefrom and in a position to engage the arm 16 at a point close to its connection to the shaft 13. The cam plate 18 also includes a second cam means in the form of an inclined surface 20 spaced along the plate from the first cam means 19 as shown. The arrangement is such that when the arm 16 is swung through approximately ninety degrees, the cam follower portion 17 thereof will be positioned for engagement by the inclined surface 20.

The extreme left end of the slide plate 18 includes an upwardly projecting portion 21 adapted to be coupled to any suitable solenoid or equivalent power driving structure to slide the slide plate in the direction of the arrow as shown. Sliding movement of the plate is guided in a rectilinear direction by suitable pins 22 and 23 projecting through slots 24 and 25 in the frame 10.

The operation of the device may best be understood by now referring to FIGURE 2 showing successive stages of the cam action.

Thus, referring to the top diagram A, the various parts of the mechanism are in the same position as illustrated in solid lines in FIGURE 1. In this position, the pinch wheel 12 is spaced from the capstan 11. Thus, the two members to be brought into engagement are widely separated and the capstan 11 is free to receive a tape.

With the arrangement as shown, if the slide plate 18 is now moved to the left through the small distance $d$, the edge of the first cam 19 will engage the arm 16 as shown and since its point of engagement is relatively close to the point of connection of the arm to the shaft 13, a very small movement will effect a large swinging movement of the arm 16 through approximately ninety degrees to the position illustrated in the diagram B.

In the position illustrated in diagram B, the cam follower portion 17 is brought into a position adjacent to the inclined surface 20 constituting the second cam. In this position, the pinch wheel 12 is brought almost into engagement with the capstan 11. It will be noted that the pinch wheel 12 has thus been moved through a relatively large distance as a consequence of a very small movement of the slide plate 18. However, relatively little force exerted on the slide plate is required since the pinch wheel 12 is free to revolve on the shaft 13 and is not opposed by any force other than the weight of the pinch wheel.

When it is desired to bring the pinch wheel 12 into tight engagement with the capstan 11, a relatively large force is required. This large force is effected by the second camming surface 20 and as will be noted when the slide plate 18 is moved from the position illustrated in diagram B to the position illustrated in diagram C, the inclined surface 20 will cam the far end of the cam follower 17 of the arm 16 to cause an additional arcuate movement of the arm. This additional distance is very small compared to the initial arcuate movement. However, the mechanical advantage realized through the long lever action of the arm 16 and inclined plane surface 20 results in a large engaging force between the pinch wheel 12 and capstan 11 to bring these parts together into very tight engagement.

To release the pinch wheel 12 from the capstan 11, it is merely necessary to slide the slide plate 18 to the right and the cam follower portion 17 of the arm will then slide down the inclined surface 20 and the arm will then be free to drop to the position illustrated in FIGURE 1.

From the foregoing description, it will be evident that the double cam device has enabled the pinch wheel 12 to be brought into tight engagement with the capstan 11, the initial movement of the pinch wheel extending through a relatively large distance and yet requiring only a very small movement of the slide plate 18. The final movement of the pinch wheel into engagement with the capstan 11, however is effected with a relatively large force as a consequence of the operation of the inclined camming surface 20 against the cam follower portion 17 of the arm. Thus, all of the advantages of large separation and yet tight engaging force between the pinch wheel and capstan are realized without an unduly bulky cam structure.

As mentioned heretofore, while the invention has been described in conjunction with a pinch wheel and capstan, it will be understood that the principles are applicable in any instance in which it is desired to move a first member such as the pinch wheel 12 into engagement with a second member such as the capstan 11 and wherein it is desirable that the members be widely separate initially.

Accordingly, while only one specific embodiment of the invention has been set forth and described, it will be understood by those skilled in the art that various modifications, changes and adaptations may be effected without departing from the scope of the invention.

What is claimed is:

1. A double cam device for moving a first member into tight engagement with a second member wherein said first member is mounted on a rotatable shaft and said second member is mounted on a frame supporting said shaft, comprising: a laterally extending arm mounted on said rotatable shaft; a slide plate mounted for sliding movement on said frame and having first and second cam means positioned such that initial movement of said slide plate causes said first cam means to engage said arm close to its point of connection to said shaft to effect a large swinging movement of said arm, further movement of said slide plate causing said second cam means to engage the far end portion of said arm to cause an additional smaller swinging movement of said arm, whereby initial movement of said first member towards said second member is large and the final engaging movement thereof into tight engagement with said second member is relatively small.

2. A double cam device for moving a first member into tight engagement with a second member, comprising, in combination: a frame carrying said second member; a shaft carrying said first member and mounted on said frame for rotation from a first position in which said first member is spaced from said second member to a second position in which said first member is in tight engagement with said second member; an arm extending laterally from said shaft, said arm terminating in a cam follower; and a slide plate slidably mounted on said frame and including a first cam means adapted to engage said arm at a point close to its connection to said shaft and a second cam means in the form of an inclined surface spaced along said slide member from said first cam means, sliding movement of said slide member initially causing said first cam means to engage said arm and swing it through a given arc to position said first member close to said second member and bring said cam follower into position for engagement by said inclined surface, further movement of said slide plate causing said inclined surface to cam said arm further along said arc through an additional arc to effect tight engagement of said first and second members.

3. A double cam device according to claim 2, in which said initial movement of said slide plate to move said arm through said given arc is less than final movement of said slide plate to move said arm through said additional arc, said additional arc being less than said given arc.

4. A double cam device for moving a pinch wheel into engagement with a capstan comprising, in combination: a frame supporting said capstan; a shaft mounted on said frame for rotation about an axis spaced from and transverse to the axis of said capstan, said pinch wheel being mounted on said shaft such that rotation of said shaft from a first position to a second position swings said pinch wheel towards said capstan; an arm extending at right angles from one end of said shaft, said arm terminating in a cam follower; and a slide plate mounted for sliding movement on said frame and including a first cam positioned to engage said arm close to its point of connection to said one end of said shaft when said shaft is in said first position and a second cam in the form of an inclined surface spaced along said slide member from said first cam, sliding movement of said plate causing said first cam to cam said arm through substantially ninety degrees to position said cam follower adjacent to said inclined surface, further sliding movement of said slide plate causing said inclined surface to cam said arm further in the same direction thereby urging said pinch wheel into tight engagement with said capstan.

References Cited in the file of this patent
UNITED STATES PATENTS 3,084,800     Baxter _____ Apr. 9, 1963
3,096,920     Schober _____ July 9, 1963